Dec. 3, 1935.  M. G. CHANDLER  2,022,653
FUEL FEEDING MEANS FOR INTERNAL COMBUSTION ENGINES
Filed July 5, 1928  6 Sheets-Sheet 1

Inventor
M. G. CHANDLER.
Attorney

Dec. 3, 1935.  M. G. CHANDLER  2,022,653
FUEL FEEDING MEANS FOR INTERNAL COMBUSTION ENGINES
Filed July 5, 1928  6 Sheets-Sheet 5

Inventor
M. G. CHANDLER.
By Geo. P. Wright
Attorney

Patented Dec. 3, 1935

2,022,653

UNITED STATES PATENT OFFICE 2,022,653

FUEL FEEDING MEANS FOR INTERNAL COMBUSTION ENGINES

Milford G. Chandler, Flint, Mich.

Application July 5, 1928, Serial No. 290,492

33 Claims. (Cl. 103—162)

This invention relates to internal combustion engines, and particularly to novel means for feeding fuel to such engines, and is a companion application of my application filed even date herewith, the object being to provide the absolute uniform distribution of fuel to all of the cylinders of the engine.

The primary object of the invention is to provide a simple, reliable and positive device to force fuel under pressure and in quantities measured for individual explosions, to nozzles anterior to the inlet valves of the individual cylinders of an internal combustion engine.

Prior to my invention, means have been proposed for accomplishing this general result, but my device provides for more precise adjustment by a single means for the delivery to the several nozzles disposed to feed into the respective cylinders of the engine. The invention includes a rotary valve member, which assures positive timing, unvarying in relation to the pump plunger strokes, of the opening and closing of the pump ports.

My invention provides a system of porting which makes it possible, if so desired, to have but a light load on the rotary valve member bearing surfaces. This is due to the fact that the device can be designed even for a six cylinder motor, in such manner that when one cylinder is being fed at any one time, and as a result, when one plunger is delivering at one time, it is necessary to maintain only enough pressure on the rotary valve member to seal one port at a time to prevent leakage of the fuel pumped by said plunger; as only at the moment of delivery is there any pressure upon the canal and that pressure will be measured by the resistance to the flow past the nozzles.

Another object of the invention is to provide fuel forcing means connected with the air controlling throttle valve in such a manner that movements imparted to the throttle valve are also imparted to the pump control, whereby the amount of fuel fed is varied with the throttle movements.

Another object is to furnish a mechanism of this character, in which the pump plungers are positively moved on both the intake and delivery strokes. Means are also provided to prevent free travelling of the plungers on the intake strokes.

A still further object is to provide fuel pumping means including springs to maintain tightness of the plunger packing, and rotary valve member. Such spring means makes it possible to run the mechanism for long periods of time without developing leakage at the rotary valve or packing.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings.

Referring first to Figures 1, 2, 13 and 14, it will be noted that in the embodiment of my invention as shown, my mechanism is combined with an ordinary internal combustion engine 1, of the four cylinder, four cycle type. 2 designates the intake manifold, and 3 the exhaust manifold of this engine. As is usual in such engines, the intake manifold leads to air passageways 4, formed within the cylinder block, and these passageways are controlled by valves 5, which are actuated by cams 6 on a cam shaft 7, that is driven in the usual manner from the crank shaft 8 of the engine. Each cylinder has the usual spark plug 9.

Figure 1:
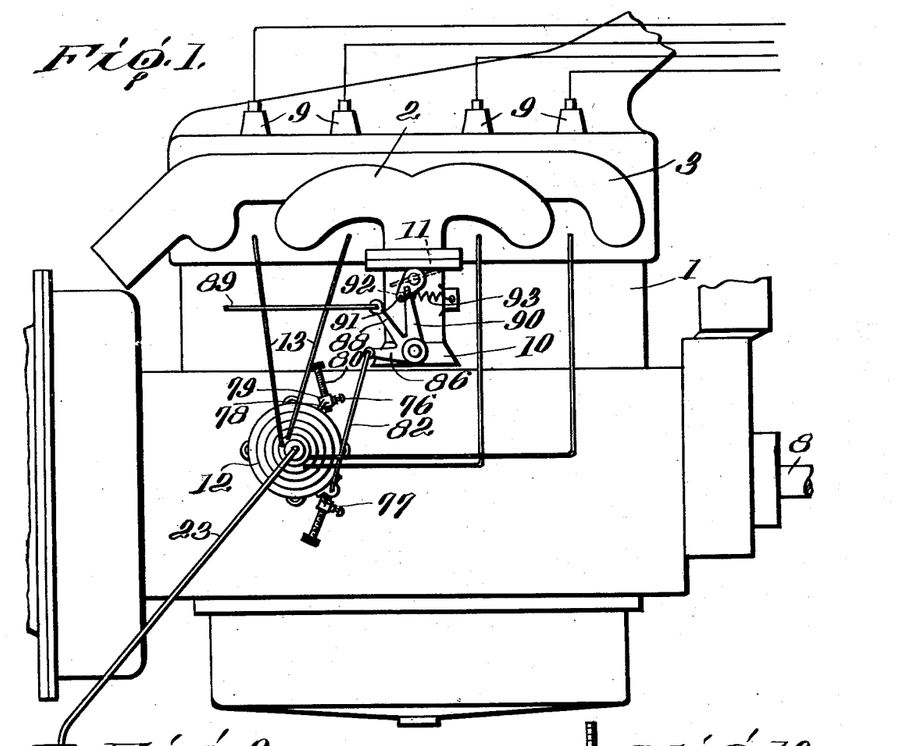
Figure 1 is a side view of an internal combustion engine fitted with my improvements.
Figures 2, 13:
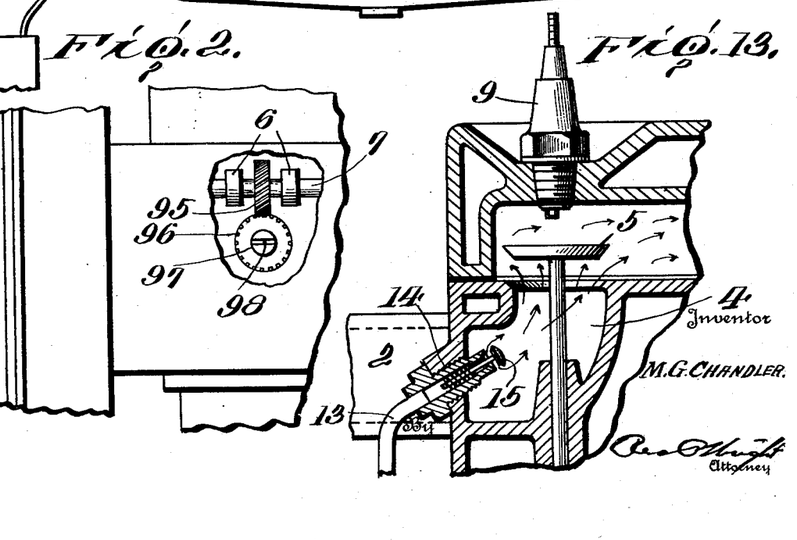
Figure 2 is a detail illustrating the manner in which the pump shaft is driven from the cam shaft of the engine.
Figure 13 is a transverse vertical sectional view of a portion of one of the engine cylinders and illustrating the manner in which each nozzle discharges its fuel into the air passageway leading into the cylinder.

Generally, in motor vehicles, of the present day, an explosive mixture is fed into the intake manifold from a carbureter, but in the present invention, the intake manifold is used merely for the passage of air which enters through the flared end 10 of the manifold and is controlled by a throttle 11. Also in the present invention, a pump 12 is employed to force fuel at proper times through pipes 13, to nozzles 14 leading into the passageways 4. When a charge of fuel is forced through one of the nozzles, it mixes with the air travelling through the passageway into which the nozzle extends, and then this mixture passes the inlet valve 5 and enters the cylinder. This preferably takes place while the piston of this cylinder is on its suction stroke.

Each nozzle has a spring closed outlet valve 15 which normally shuts off the fuel from the nozzle, and is only unseated when pressure is created in the pipe 13 leading to the nozzle.

As will be described hereinafter, the throttle 11 is connected to the pump by means for varying the stroke of the pump when the throttle is shifted.

Figure 5:
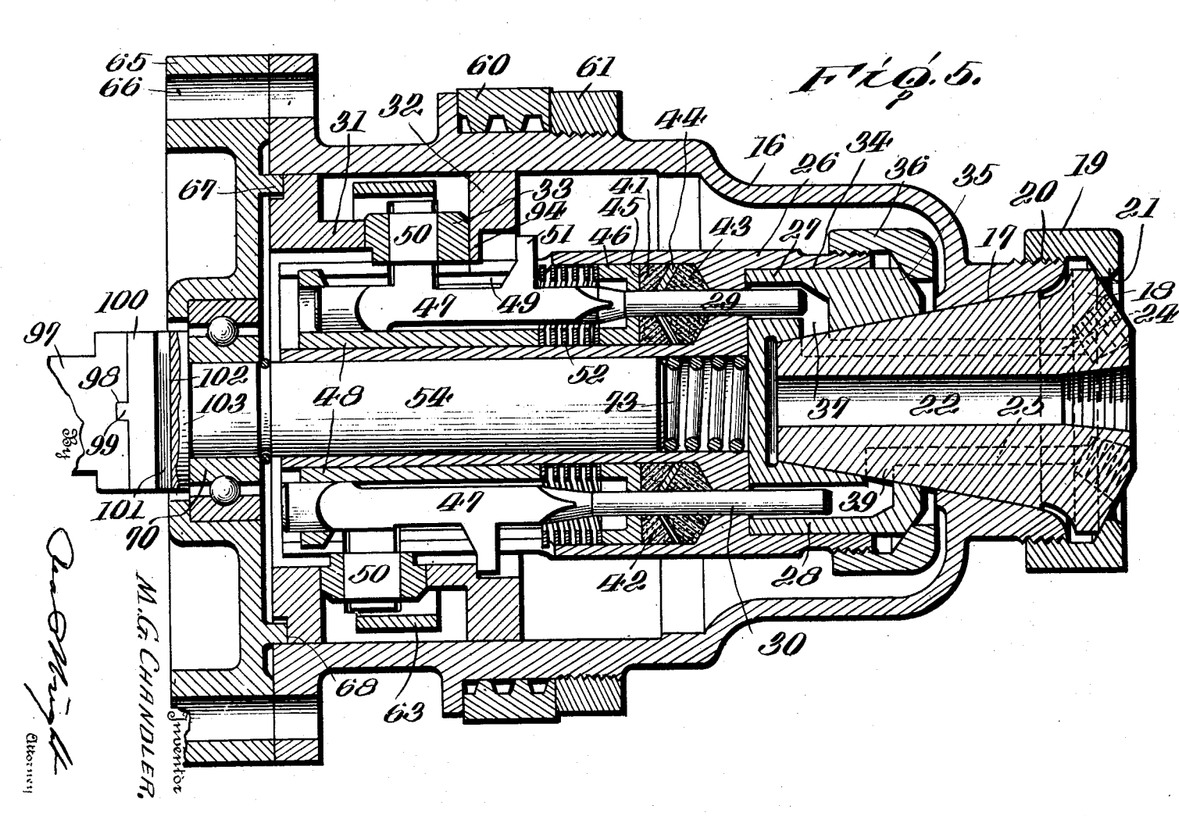
Figure 5 is a vertical longitudinal sectional view of the pump.
Figure 7:
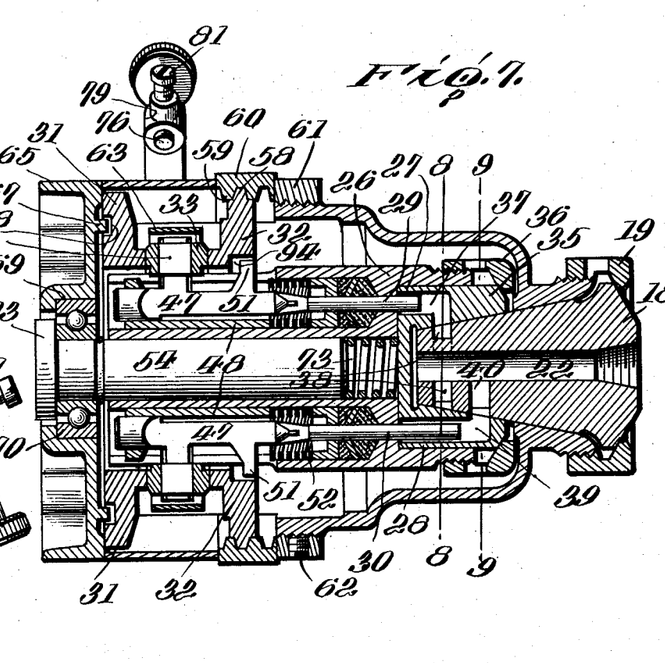
Figure 7 is a view similar to Figure 5, but taken on line 7—7 of Figure 6.
Figure 8:
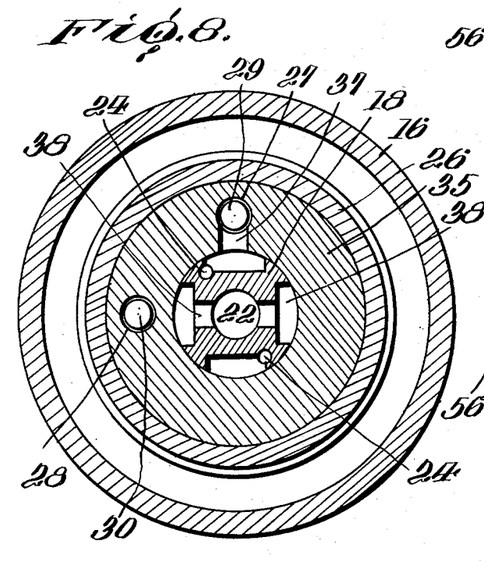
Figure 8 is a transverse vertical sectional view taken on line 8—8 of Figure 7.
Figures 9, 11, 12:
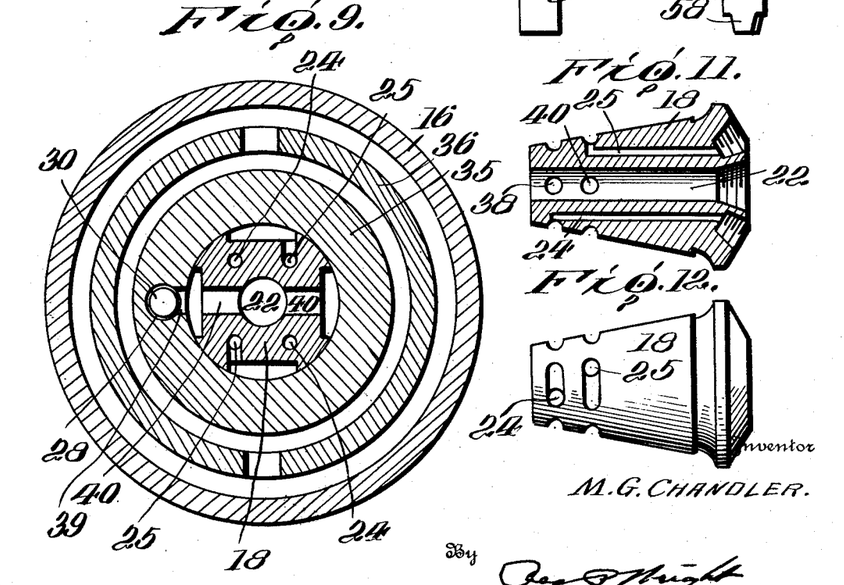
Figure 9 is a similar view taken on line 9—9 of Figure 7.
Figure 11 is a diametrical sectional view of the stationary cone forming part of the valve means of the pump.
Figure 12 is a plan view of said cone.

The pump is best illustrated in Figures 5 and 7. It consists of a tubular casing 16, provided at one end with a frustro-conical seat 17 which snugly engages the outer surface of a cone 18, the latter being fixed in position by a nut 19 which is screwed to the casing at 20, and is provided with an inwardly extending annular flange 21 overlapping the edge of the cone.

The cone has an axial bore 22 which receives fuel from any suitable source of supply, through a pipe 23. This fuel, as will be described hereinafter, is drawn from the bore 22, and is forced through passageways 24 and 25, into the pipes 13 which lead to the nozzles 14.

The pumping means consists of a rotor 26 having cylinders 27 and 28 in which plungers 29 and 30 reciprocate. Such reciprocation is caused by non-rotatable cams 31 and 32 which form tracks on which rollers 33 of the plungers roll as the rotor revolves.

The rotor preferably consists of a casting having a circular recess 34 at one of its ends to receive a valve 35 which turns with the rotor, and is fixed to the latter by a nut 36. The valve has a passageway 37 to place the plunger cylinder 27 in communication with the fuel intake ports 38 of the cone 18, or with the fuel outlet passageways 24 that lead to some of the pipes 13.

A similar port 39 places the plunger cylinder 28 in communication with intake ports 40 of the cone, successively or with the outlet passageways 25 of the latter, which lead to certain of the pipes 13.

The rotor casting has a pair of bores 41 and 42 arranged 90 degrees from one another (see Fig. 6), and each of these bores is provided with an inner packing 43, inner gland 44, outer packing 45, and outer gland 46 for its respective pump plunger. Each plunger has an enlarged portion 47 which slides in a guide bushing 48 arranged in the bore 41 or 42. Each guide bushing has a longitudinal slot 49 in which the axle 50 of the roller 33, as well as the spur 51 of the plunger slides. The spurs 51 travel in a recess cut in the adjustable cam 32 which provides a shoulder as at 94 against which the spurs impinge when the cam has retracted the pump pistons to the extent of their excursions, thus effectively preventing the momentum of the pistons from carrying them further than the prescribed distance, regardless of the space between the cams when adjusted for a short stroke of the pump pistons. The axle 50 is integral with the plunger.

The bushings 48, in addition to guiding the enlargements, also form means for properly maintaining the packing of the plunger. To this end, a coil spring 52 is arranged over each plunger which bears at one end against the gland 46, and at its other end against the bushing 48, and the opposite end of each bushing is held in place and axially adjusted by means of a screw 53, (see Fig. 6). When the actuating shaft 54 of the rotor is removed, this screw 53 may be turned to adjust the bushings 48, and when the shaft is again inserted into the rotor, the periphery of the shaft will enter a notch 55 in the head of the screw 53 to hold the latter against turning.

Figure 6:
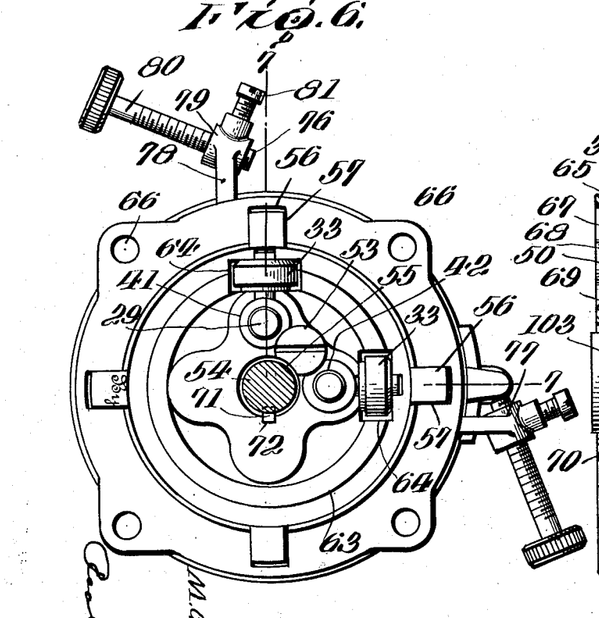
Figure 6 is an end view of the pump with its cover plate removed.
Figure 10:
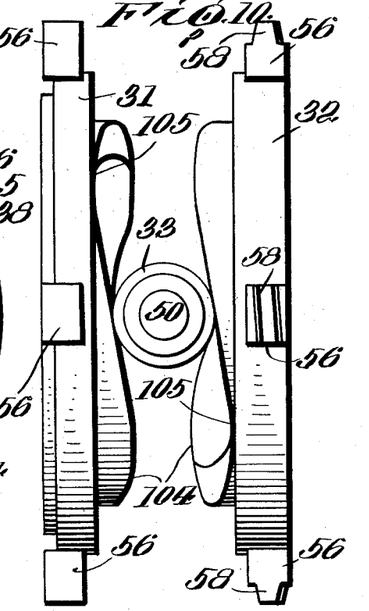
Figure 10 is a side view of the plunger operating cams removed from the casing, and illustrating the manner in which they contact with the plunger rollers.

As best shown in Figures 6, 7 and 10, each of the roller tracks or cams consists of a ring provided with radially disposed fingers 56 which enter longitudinally disposed grooves 57 in the casing. The tips of the fingers 56 of the inner one 32 of the cams, are provided with portions of threads 58, and at the points where these threads are located, the casing is apertured to permit the threads to be engaged by similar threads 59 on a rotatable cam adjusting ring 60. This ring is retained in position by a nut 61 which is mounted on the exterior of the casing, and is locked in position by a screw 62. When the ring 60 is turned, the cam 32 is adjusted axially of the casing, and this movement is used to adjust the stroke of the plungers, it being obvious that if the cam 32 is moved in a direction away from the cone 18, the stroke of the plungers will be longer than it was previous to such movement.

A ring or flange 63 is mounted on the casting of the rotor, and as shown in Figure 6, this flange has recesses 64 to receive the rollers 33 of the plungers.

A cover plate 65 is arranged at one end of the casing, and may be secured in place by screws or bolts which pass through the apertures 66 of the casing. This cover plate has an annular flange 67 which enters an annular groove 68 in the cam 31, for the purpose of mounting said plate in alignment, and the cover plate also has a circular socket 69 to receive a ball-bearing 70 which supports the shaft 54. The latter, as best shown in Figure 6, has a spline 71 engaging a groove 72 in the rotor. Due to this construction, when the cover plate 65 is removed, the shaft 54 may be readily withdrawn from the bore of the rotor.

A coiled spring 73 is arranged between the valve 35 of the rotor and the end of the shaft 54, and this spring urges the rotor toward the cone 18 to insure a snug engagement of the conical surfaces of the cone and valve.

Figure 3:
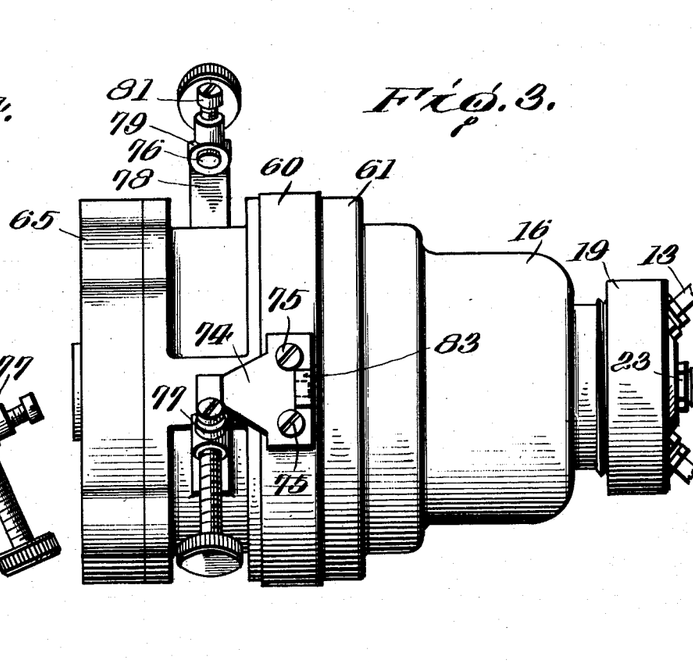
Figure 3 is a side view of the improved pump.
Figure 4:
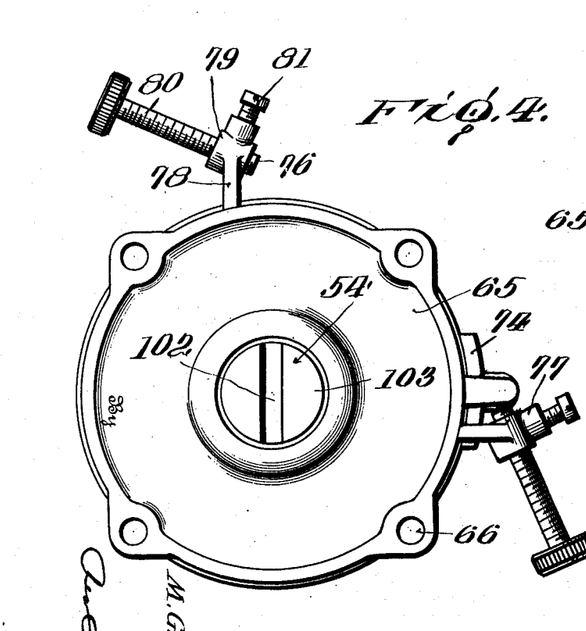
Figure 4 is an end view of the same.

As best illustrated in Figures 3 and 4, the cam actuating ring 60 is provided with an abutment 74 which is secured in place by screws 75. This abutment is designed to travel between stops 76 and 77 mounted on the casing 16. Each of these stops preferably consists of an arm 78 integral with the casing, and having a threaded ring 79 at its extremity. A thumb screw 80 is adjustably mounted in the ring, and may be locked in position by a screw 81.

Figure 14:
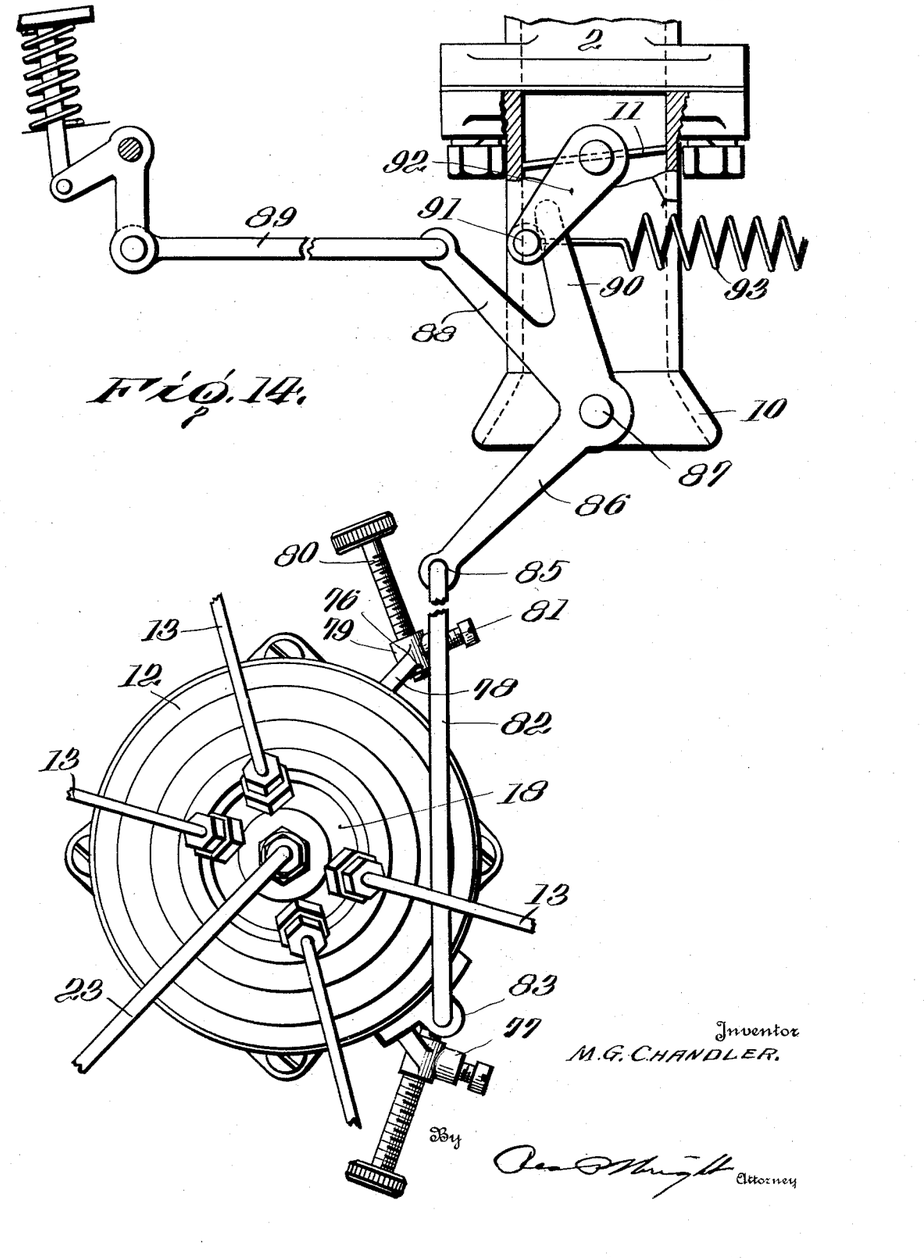
Figure 14 is an enlarged detail, showing the manner of simultaneously actuating the air control throttle and controlling the output of the pump.

Referring to Figures 1, 3 and 14, it may be seen that a link 82 has one of its ends hooked through an eye 83 on the abutment 74, and its other end pivotally connected at 85 to one arm 86 of a plural-armed lever which is pivotally mounted at 87 on the flared end 10 of the manifold 2. Another arm 88 of this lever is pivotally connected to a rod 89 that is to be actuated by the operator in controlling the mechanism.

A third arm 90 of the lever engages a pin 91 on the crank arm 92 of the throttle 11, and this crank arm is normally moved into position to open the throttle, by means of a spring 93, which has one of its ends connected to the crank arm, and its other end secured to the intake manifold.

The pump is driven by the following means. A worm 95 (see Figure 2), is fixed on the cam shaft of the engine, and drives a worm gear 96 which revolves a short shaft 97 that extends to the exterior of the cylinder block. This shaft is provided at its outer end with a cross slot or groove 98. From Fig. 5, it may be seen that this groove receives a rib 99 on a loose connecting element 100, which has a second rib 101 arranged at right angles to the first rib and extending into a groove 102 arranged in the head 103 of the pump shaft 54. This provides a universal joint between the shafts 54 and 97.

In the operation of the mechanism, as shown when used in connection with a four cylinder four cycle engine, the shaft 54 is preferably driven at one-half the crank shaft speed, and through the spline 71, the pump shaft drives the rotor 26, and the parts attached to the rotor revolve with it. As the lobes 104 (see Figure 10), of the cams are staggered, and are opposite the depressions 105, the rollers 33 of the plungers are forced back and forth as they roll on the cams. This, of course, causes the plungers 29 and 30 to reciprocate. The arrangement is such that the plungers move alternately in opposite directions, one plunger exerting suction while the other is expelling, etc. As the plunger 29 moves on its suction stroke, (see Figure 7), it will draw the liquid fuel from the passageway 22, through one of the ports 38 into the port 37 and into pump cylinder 27. Then on the exhaust stroke, it will force this charge of fuel from 37 through one of the passageways 24 to one of the pipes 13, from which it will be discharged through the nozzle 14 of that pipe into the compartment 4, and be mixed with the air passing to that particular cylinder.

The plunger 30 on its suction strokes, will draw fuel from the bore 22 through ports 40 and 39, into the cylinder 28, and on the pressure strokes, it will force this fuel from 39 through one of the passageways 25 leading to the pipe 13 of another cylinder.

The cone 18 has two passageways 24, and two passageways 25 properly spaced so that they receive fuel in regular order from the pump as the latter revolves.

It will therefore be understood that as the pump shaft travels at one-half the speed of the engine crank shaft, each plunger pumps one charge of fuel to a cylinder with each revolution of the crank shaft, thus pumping four charges for each two revolutions of the crank shaft, the parts being so constructed and arranged that when the plunger stroke adjusting cam 32 is set to effect the maximum strokes of the plungers, the plungers begin their fuel forcing strokes substantially at the beginning of the suction strokes of the engine pistons, the adjustments for the plunger being provided to vary the lag at the beginning of their strokes.

From the foregoing description it will be seen that I have provided fuel feeding means for an internal combustion engine in which a fuel pump and distributor is combined in a single unit, having means for regulating the fuel forcing means and means for regulating the air supplying means so connected that as one is regulated to vary the supply, the other will be regulated to form a uniform or differentiated relationship to each other so that the most efficient quality of mixture may be provided under all circumstances of operation whereby I am able to provide a fuel feeding means which has many advantages over other devices of this character now in use, as I am able to form a single unit to deliver individual charges to the various cylinders of the engine without the addition of a distributor.

In the operation of the engine, the air throttle valve 11 remains closed at all times, except upon movement of the control rod 89. When such movement takes place, the arm 86 causes the link 82 to shift the cam adjusting ring 60, whereby as the valve 11 is opening, the length of the strokes of the plungers will be increased and vice versa.

The pump is preferably so timed relatively to the engine that each inlet valve 5 will open a short time before the nozzle of that cylinder actuates. Consequently, air will be moving in the passageway 4, and the head of the cylinder at the time the fuel is injected, providing a stratum of pure air over the piston top tending to keep it clean and cool.

From the foregoing description, it is believed that the construction, operation and advantages of the invention will be readily understood, and it is apparent that changes may be made in the details disclosed without departing from the spirit of the invention, as expressed in the claims.

What I claim is:—

1. In a fuel feeding means for use in conjunction with multiple cylinder internal combustion engines, a plurality of revolubly mounted displacement members for measuring and feeding fuel through individual ducts for the several cylinders of the engine, stationary actuating means operating equally on the several displacement members to cause movement in one direction as said displacement members revolve and a second stationary actuating means operating equally on the several displacement members to cause a return movement towards the first actuating means and oscillating adjusting means to axially adjust one actuating means to vary the amount of return of the several displacement members all to the same extent for the purpose of regulating the amount of displacement by all equally.

2. In a fuel feeding device for internal combustion engines, a conical stationary member provided with a plurality of rows of ports, each row consisting of inlet and outlet ports alternately disposed, a plurality of displacement members mounted to revolve around said conical member each having a single passage so disposed that it may move into registry successively with all the ports in one of the rows of ports on the stationary member, common means for actuating the several displacement members all to the same extent, the said passage registering with one port of the stationary member at a time and so arranged that delivery from each exhaust port is carried away through its individual duct.

3. In fuel feeding means for internal combustion engines, a tapering stationary member having a fuel inlet and provided with a plurality of inlet ports and a plurality of outlet ports alternately arranged in respect to said inlet ports, a member containing a displacement member revolving on the stationary member and provided with a port, said displacement member being actuated in such a manner that it makes a number of intake strokes equivalent to the number of inlet ports and alternating with said strokes to produce discharge strokes of equal number, said port in the rotary member being brought successively and alternately into registry with the several inlet ports and outlet ports in such manner that fuel is forced out of but one of the outlet ports at one time, the fuel in said ports being placed under pressure only at the time of delivery from one outlet port.

4. In a fuel feeding means for use in internal combustion engines, a displacement member operating in conjunction with suitable valve means and suitable actuating means to pump fuel to supply the engine, said actuating means consisting of two opposed elements, one operating to move said displacement member in one direction and the other operating to return said displacement member in the opposite direction, said second operating means being adjustably mounted so that it may be so set as to return said displacement member to a predetermined position, an additional member carried by said displacement member to prevent free return beyond the position for which the adjustment is set for the purpose of positively controlling the amount of fuel displacement.

5. In a fuel feeding means for use with internal combustion engines, a displacement member mounted to revolve around a common axis operating in conjunction with suitable valve means to pump charges of fuel to supply one or more cylinders, stationary positively actuating means adapted to move said displacement member in one direction, a second stationary positively actuating means adapted to move said displacement member in the reverse direction, oscillating means for adjusting one of said stationary actuating means axially to regulate its action in moving said displacement member, said adjusting means being for the purpose of amplifying or limiting the movement of the displacement means in order to change the amount of fuel displaced.

6. In fuel feeding means for internal combustion engines, a stationary member, a ported rotary valve cooperating with said member, means for moving fuel in the ports of the valve as the latter rotates, said stationary member comprising a frustro cone having an axial intake port and a series of outlet ports between the axial port and the periphery of the stationary member, and other ports in the stationary member for placing its intake port in communication with the ports of the valve.

7. In means for feeding fuel to an internal combustion engine, a rotor, a plunger carried by the rotor, spaced non-rotatable cams cooperating with the plunger to reciprocate the latter while the rotor revolves, and oscillating means cooperating with one of said cams for shifting said cam axially to vary the output of the pump.

8. In means for feeding fuel to an internal combustion engine, a rotor driven and timed by the engine, a plunger provided with a roller carried by the rotor, non-rotatable cams cooperating with the roller of said plunger to reciprocate the latter while the rotor revolves and oscillating means encircling said cams and cooperating with one of said cams for shifting the same axially to vary the output of the pump.

9. A fuel pumping means for internal combustion engines comprising a stationary casing, a shaft in the casing adapted to be driven and timed from the engine, a rotor actuated by the shaft provided with a conical portion, reciprocating plungers mounted in said rotor, a valve having a conical seat cooperating with the conical portion of said rotor, rollers connected to the plungers, opposed cams on which the rollers roll for reciprocating the plungers and oscillating means surrounding said casing for adjusting one of said cams axially.

10. In a fuel feeding means for internal combustion engines, a stationary member, a ported rotary valve driven and timed by the engine cooperating with said member, means for moving fuel in the ports of the valve as the latter rotates, said stationary member comprising a frustro cone having an axial inlet port and a series of outlet ports between the axial port and the periphery of the stationary member, other ports in the stationary member for placing the intake port in communication with the ports of the valve, said ports being so arranged that only one port is subjected to the pressure of the pump at the moment of delivery of fuel therefrom and means for varying the quantity of fuel passing through said ports.

11. In a fuel feeding means for an internal combustion engine, a stationary member comprising a frustro cone having an axial inlet port, and a series of outlet ports between the axial port and the periphery of the stationary member, a rotor driven and timed by the engine having a conical socket to receive the frustro cone of the stationary member, said rotor being provided with cylinders adapted to register with the ports of the stationary member, pistons working in said cylinders and means for reciprocating said pistons as said rotor revolves, said ports being so arranged that only one port is subjected to the pressure of the pump at the moment of delivery of fuel therefrom.

12. In a fuel feeding means for an internal combustion engine, a stationary member comprising a frustro cone having an axial inlet port, and a series of outlet ports between the axial port and the periphery of the stationary member, a rotor driven and timed by the engine having a conical socket to receive the frustro cone of the stationary member, said rotor being provided with cylinders adapted to register with the ports of the stationary member, pistons working in said cylinders and means for varying the stroke of said pistons as the rotor revolves, said ports being so arranged that only one port is subjected to the pressure of the pump at the moment of delivery of fuel therefrom.

13. In a fuel feeding means for internal combustion engines, a stationary conical member having an axial intake port and a series of outlet ports between the axial port and the periphery of the same, a rotor driven and timed by the engine having a conical socket to receive said conical stationary member, said rotor being provided with cylinders having ports communicating with the outlet ports of said stationary member as the rotor revolves, pistons in said cylinders and means for reciprocating said pistons as said rotor revolves for discharging fuel successively through said outlet ports, said ports being so arranged that only one port is subjected to the pressure of the pump at the moment of delivery of fuel therefrom.

14. A fuel feeding means for internal combustion engines comprising a stationary conical member having a main fuel inlet and a plurality of fuel inlets and outlet ports, a revoluble member driven and timed by the engine having a conical socket adapted to receive the conical member, said revoluble member having a plurality of chambers provided with ports adapted to successively register with the inlet and outlet ports of said conical member, pistons mounted to reciprocate in said chambers and means for reciprocating said pistons as said member is rotated, said ports being so arranged that only one port is subjected to the pressure of the pump at the moment of delivery of fuel therefrom.

15. A fuel feeding means for internal combustion engines comprising a stationary member having an axial intake port and a series of outlet ports between the axial port and the periphery of said stationary member, a revoluble member driven and timed by the engine surrounding said stationary member having ports registering with the ports of the stationary member, cylinders in communication with said ports, pistons mounted to reciprocate in said cylinders and means for reciprocating said pistons as said rotary member revolves, said ports being so arranged that only one port is subjected to the pressure of the pump at the moment of delivery of fuel therefrom.

16. A fuel feeding means for internal combustion engines comprising a stationary member having an axial fuel inlet and a series of inlet and outlet ports between the axial inlet and the periphery of said stationary member, a revoluble member driven and timed by the engine surrounding said stationary member having ports registering with the ports of the stationary member, cylinders in communication with said ports, pistons mounted to reciprocate in said cylinders, means for reciprocating said pistons as said rotary member revolves and means for adjusting the means for reciprocating said plungers to vary the stroke of said plungers, said ports being so arranged that only one port is subjected to the pressure of the pump at the moment of delivery of fuel therefrom.

17. A fuel feeding means for internal combustion engines comprising a combined pump and distributor, said pump comprising a rotary member driven and timed by the engine with a reciprocating piston, said distributor comprising a stationary member with a longitudinally disposed fuel inlet and a series of ports, said members having contacting surfaces inclined to the axis of said members and means for resiliently holding said members together, said ports being so arranged that only one port is subjected to the pressure of the pump at the moment of delivery of fuel therefrom.

18. A fuel feeding means for internal combustion engines comprising a combined pump and distributor, said pump comprising a rotary member driven and timed by the engine with a socket and reciprocating pistons, said distributor comprising a stationary member with a longitudinally disposed fuel inlet and having a series of ports adapted to fit in said socket, said members having contacting surfaces inclined to the axis of said members and means for resiliently holding said members together, said ports being so arranged that only one port is subjected to the pressure of the pump at the moment of delivery of fuel therefrom.

19. A fuel feeding means for internal combustion engines comprising a combined pump and distributor, said pump comprising a rotary member driven and timed by the engine provided with a socket and with reciprocating pistons operated by stationary cams, means for adjusting said cams to vary the stroke of said pistons, said distributor comprising a stationary member with a longitudinally disposed fuel inlet and having a series of ports adapted to fit within the socket of the rotary member, said members having contacting surfaces inclined to the axis of said members and means for resiliently holding said members together, said ports being so arranged that only one port is subjected to the pressure of the pump at the moment of delivery of fuel therefrom.

20. A fuel feeding means for internal combustion engines comprising a combined pump and distributor, said pump comprising a rotary member driven and timed by the engine having a socket and reciprocating pistons, said distributor comprising a stationary member with a longitudinally disposed fuel inlet and a plurality of longitudinally disposed outlets, said distributor adapted to fit within the socket of the rotary member, said members having contacting surfaces inclined to the axis of said members and means for resiliently holding said members together, said ports being so arranged that only one port is subjected to the pressure of the pump at the moment of delivery of fuel therefrom.

21. A fuel pumping means for internal combustion engines comprising a stationary casing, a rotor having a conical portion in the casing adapted to be driven and timed from the engine, reciprocating plungers mounted in said rotor, a valve having a conical seat cooperating with the conical portion of said rotor, rollers connected to the plungers, non-rotatable opposed cams on which the rollers roll for reciprocating the plungers and oscillating means surrounding said casing for adjusting one of said cams axially.

22. In a fuel feeding means for internal combustion engines, a stationary member having a longitudinally disposed inlet port and longitudinally disposed outlet ports, said member having a conical outer surface, a rotary valve member having a conical socket to receive said conical stationary member, a rotor movable with said valve member and driven and timed by the engine, plungers disposed longitudinally of and eccentric to the axis of said rotor and valve member cylinders disposed in said valve member to receive said plungers having ports adapted to communicate with the inlet and outlet ports of said stationary member, resilient means for forcing the conical surface of said valve and stationary member together, said ports in the stationary member being so arranged in respect to the ports of the cylinders that only one port is subjected to the pressure of the pump at the moment of delivery of fuel therefrom as the valve member revolves.

23. In a fuel feeding means for internal combustion engines, a plunger, a guide bushing for the plunger having a slot, an axle on the plunger extending through said slot, a roller on said axle, spaced non-rotatable cams engaging said roller, and means carried by said plunger engaging one of said cams for limiting the movement thereof on the suction stroke.

24. In a fuel pumping means for internal combustion engines, a stationary casing, a shaft in the casing adapted to be driven and timed from the engine, a rotor actuated by the shaft, plungers movable with the rotor, rollers connected to the plungers, non-rotatable opposed cams on which the rollers roll for reciprocating the plungers and an oscillating member mounted on the casing engaging one of said cams for adjusting said cam axially.

25. A fuel pump for internal combustion engines having a stationary member and a rotor driven and timed by the engine provided with bearing surfaces inclined to the axis of said stationary member and rotor, a spring for holding said inclined bearing surfaces in contact with one another, said rotor being provided with cylinders and reciprocating plungers, said stationary member being provided with inlet and outlet ports, said ports being so arranged that only one port is subjected to the pressure of the pump at the moment of delivery of fuel therefrom.

26. In means for feeding fuel to an internal combustion engine, a rotor driven and timed by the engine, a plunger carried by the rotor, non-rotatable spaced cams cooperating with the plunger to reciprocate the latter while the rotor revolves, means cooperating with one of said cams for shifting the same axially to vary the output of the pump and means carried by the plunger adapted to engage the movable cam for limiting the movement of the plunger on the suction stroke thereof.

27. In fuel feeding means for internal combustion engines, a conical stationary member provided with inlet and outlet ports, a member mounted to revolve around said conical member containing a passage adapted to register with the inlet and outlet ports alternately and in such a manner that a suitably operated displacement member carried by said rotary member and operating in conjunction therewith may withdraw fuel from the inlet ports and expel it through the outlet ports, the displacement member exerting pressure on the cooperating members only at the time of delivery of the fuel through the outlet.

28. A fuel pumping means for internal combustion engines comprising a stationary casing provided with a frusto conical seat, a shaft in said casing adapted to be driven and timed from the engine, a cone extending through said frusto conical seat and fixed therein, a rotor actuated by said shaft having a valve with a frusto conical socket to receive said cone, means for resiliently holding the inclined faces of said cone and socket in contact with one another, plungers mounted in said rotor, opposed stationary cams for reciprocating said plungers and means for adjusting one of said cams to vary the stroke of said plungers.

29. In a fuel pumping means for internal combustion engines, a stationary casing, a shaft in the casing adapted to be driven and timed from the engine, a rotor actuated by the shaft, plungers movable with the rotor, rollers connected to the plungers, non-rotatable opposed cams on which the rollers roll for reciprocating the plungers and means mounted on the casing engaging one of said cams for adjusting said cam axially.

30. In means for feeding fuel to an internal combustion engine, a rotor driven and timed by the engine, a plunger carried by the rotor, non-rotatable spaced cams cooperating with the plunger to reciprocate the latter while the rotor revolves, means cooperating with one of said cams for shifting the same axially to vary the output of the pump and means for limiting the movement of the plunger on the suction stroke thereof.

31. A fuel pumping means for internal combustion engines comprising a stationary casing, a shaft in the casing adapted to be driven and timed from the engine, a rotor actuated by the shaft provided with a conical portion, reciprocating plungers mounted in said rotor, a valve having a conical seat cooperating with the conical portion of said rotor, rollers connected to the plungers, opposed cams on which the rollers roll for reciprocating the plungers and means for adjusting one of said cams axially.

32. A fuel feeding means for internal combustion engines comprising a combined pump and distributor, said pump comprising a rotary member driven and timed by the engine having a reciprocating piston, said distributor comprising a stationary member provided with fuel inlets and outlet ports, said members having surfaces inclined to the axis of said members contacting with one another, said ports being so arranged that only one port is subjected to the pressure of the pump at the moment of delivery of fuel therefrom.

33. In a fuel feeding means for internal combustion engines, a stationary member having a frusto cone provided with an axial fuel inlet and a series of ports in communication with said fuel inlet, a rotor driven and timed by the engine having a conical socket to receive said frusto cone of the stationary member, said stationary member having a plurality of outlet ports, said rotor being provided with cylinders adapted to alternately register with the ports of the stationary member, pistons working in said cylinders, and means for causing said pistons to reciprocate as said rotor revolves, said outlet ports being so arranged that only one outlet port is subjected to the pressure of the pump at the moment of delivery of fuel therefrom.

MILFORD G. CHANDLER.